United States Patent [19]

Hamar

[11] Patent Number: 4,566,202

[45] Date of Patent: Jan. 28, 1986

[54] LASER APPARATUS FOR EFFECTIVELY PROJECTING THE AXIS OF ROTATION OF A ROTATING TOOL HOLDER

[76] Inventor: Martin R. Hamar, 118 Old Ridgefield Rd., Wilton, Conn. 06897

[21] Appl. No.: 558,624

[22] Filed: Dec. 6, 1983

[51] Int. Cl.$^4$ ............................................... G01C 1/00
[52] U.S. Cl. .................................. 33/286; 33/185 R; 356/141; 408/75
[58] Field of Search ................... 33/185 R, 189, 191, 33/286, 235, 227, 228; 408/16, 75; 356/399, 138, 141

[56] References Cited

U.S. PATENT DOCUMENTS

| | | | |
|---|---|---|---|
| 2,146,906 | 2/1939 | Moller | 408/16 |
| 2,557,029 | 6/1951 | Griffin | 356/399 X |
| 3,801,205 | 4/1974 | Eggenschwyler | 33/DIG. 21 |
| 3,902,810 | 9/1975 | Hamar | 356/138 |
| 4,045,129 | 8/1977 | Hamar | 350/321 |
| 4,297,031 | 10/1981 | Hamar | 356/247 |
| 4,382,680 | 5/1983 | Hamar | 356/247 |
| 4,438,567 | 3/1984 | Raiha | 33/185 R X |

*Primary Examiner*—William D. Martin, Jr.
*Attorney, Agent, or Firm*—Anthony J. Casella; Gerald E. Hespos

[57] ABSTRACT

A laser apparatus for projecting the axis of rotation of a rotating member is provided. The apparatus includes a lasing element mounted in a housing for projecting a high resolution laser beam. The housing also has a mounting stud extending therefrom substantially colinear with the laser beam but extending from the opposite end of the housing. The mounting stud is adapted to be mounted in a rotating member such as the chuck of a rotating tool. Rotation of the rotating member with the laser apparatus therein causes the laser beam to generate an annulus on an object spaced therefrom. The center of the annulus defines the true axis of rotation of the rotating member. The rotating member and/or the non-rotating member then can be realigned with respect to one another to accurately position the axis of rotation.

16 Claims, 6 Drawing Figures

LASER APPARATUS FOR EFFECTIVELY PROJECTING THE AXIS OF ROTATION OF A ROTATING TOOL HOLDER

BACKGROUND OF THE INVENTION

Accurate alignment of a rotating tool to a work piece is essential in many machining operations. Because of this importance, it is estimated that in many machining operations at least 50% of the available time is devoted to set up, leaving less than 50% of available time to actual cutting or machining operations. This large amount of time, in part, is caused by the complexities and inaccuracies of most available alignment techniques and tools.

Currently most rotating machine tools and their work pieces are manually aligned with one another. In many such machining operations this manual alignment can determine with reasonable accuracy the point at which the cutting tool will make its initial contact with the work piece. For example, the cutting tool can be advanced toward the work piece until the initial contact is made. Then the work piece and/or tool can be adjusted to the desired point of initial contact.

Although the above described manual alignment is acceptable in many instances, there are other cutting or tooling operations where, because of the need for precision, simple mechanical alignment of the tool and work piece is unacceptable. More particularly, the above described manual alignment only determines the point of initial contact between the cutting tool and the work piece, and it does not determine the degree of alignment between the work piece and the axis of rotation of the machine, tool holder and tool. Imperfections in the tool or tool holder, dirt or other debris in or on the tool or tool holder, or errors by the machine operator are very common. Consequently although the tool generally is approximately aligned with the axis of rotation of the tool holder, their inevitably is some angular misalignment to and/or displacement from the rotational axis. The cutting or machining will be imprecise in all such instances when the axis of the tool is not collinear with the axis of rotation of the machine and the tool holder.

Alignment problems also can occur in machining operations where the alignment must take place at a point in a manufacturing process when the work piece and the rotating cutting tool are physically separated from one another by a considerable distance. Manual alignment also is made difficult for machine tool operations where the tool is intended to be angularly aligned to the exterior face of the work piece, or where the tool will perform a machining operation on an interior portion of the work piece, such as tapping threads on a previously smooth cylindrical bore.

Laser alignment systems have been developed which have many uses including the alignment of parts for assembling machines such as turbines. Currently systems of laser beams and targets are available to facilitate alignment of parts along an axis as well as assessment and correction of pitch and yaw. Examples of such systems and components are disclosed in U.S. Pat. No. 4,297,031 and U.S. Pat. No. 4,382,680 both of which issued to Martin R. Hamar and are entitled "APPARATUS AND PROCESS FOR SWEEPING A FLAT OPTICAL LIGHT PLANE." Such laser systems and components also are disclosed in copending application Ser. No. 381,079 filed May 24, 1982 by Martin R. Hamar and entitled "PENTA-PRISM MODULE HAVING LASER ALIGNMENT, ERROR DETECTION AND CORRECTION CAPABILITY" and application Ser. No. 381,078 filed May 24, 1982 by Martin R. Hamar and entitled "LASER MEASUREMENT SYSTEM, VIRTUAL DETECTOR PROBE AND CARRIAGE YAW COMPENSATOR." Despite the many very desireable features of the available laser or mechanical alignment devices or techniques, none have been able to efficiently and accurately enable true projection of an axis of rotation and/or quick accurate alignment of a work piece with an axis of rotation. Additionally it has been found that the mechanical alignment devices and techniques such as level lines and levels are subject to sagging and warping particularly at greater distances.

In view of the above, it is an object of the subject invention to provide an apparatus and method for accurately projecting an axis of rotation from a rotating tool to a work piece.

It is another object of the subject invention to provide an apparatus and method which enables accurate alignment of an axis of rotation in a minimum amount of time.

It is an additional object of the subject invention to provide an apparatus and method for aligning an axis of rotation which detects both angular misalignments and radial misalignments.

It is still a further object of the subject invention to provide an apparatus and method for aligning an axis of rotation which can be mounted directly in the rotating member.

SUMMARY OF THE INVENTION

The subject invention is directed to a laser source, such as a single transverse mode diode laser which is securely retained in a housing. The housing is adapted to be mounted directly in a rotating member, typically a rotating tool or work piece holder such as a chuck, collet or spindle.

More particularly the housing includes a pair of opposed ends, with the lasing element being disposed to project a beam from one end and with a mounting stud fixedly secured to and extending from the other end. In most instances the mounting stud will be an elongated cylinder having a diameter which can be retained by the rotatable chuck, collet, spindle or the like, such that the longitudinal axis of the mounting stud is approximately parallel to the rotational axis of the rotating tool or work piece holder. Preferably the mounting stud is substantially collinear with the laser beam but extending from the opposite end of the housing. Although absolute collinearity of the mounting stud and the laser beam is not essential, substantial collinearity is important in all instances when the subject apparatus is used with a target, as explained below. Specifically, the substantial collinearity of the mounting stud and laser beam ensures that the beam will impinge upon the central sensitive portion of the target. Adjustment screws can be provided to enable the laser beam to be accurately adjusted to the axis of the mounting stud. To facilitate proper mounting of the subject apparatus in the rotating member, it is preferred that the mounting end of the apparatus include a substantially planar mounting face which is disposed perpendicular to mounting stud. The mounting face can be positioned flush against the end of the rotating member, such as the spindle or tool or work piece holder.

The laser beam of the subject apparatus can be generated by many of the available laser light sources used in laser alignment systems. Preferably the apparatus uses a solid state diode lasing element which is based upon a self-contained solid state crystal. This particular laser light source is desirable because of its stability, its low power requirements, and its ability to generate a tightly focused beam. One preferred lasing element is a helium neon laser. The apparatus can either be connected by hard wire to an external power supply or can be operated by a battery or other power source integral with the apparatus. Preferably the radial position and angular alignment of the laser beam can be adjusted by screws or the like to achieve collinearity of the laser beam and mounting stud.

The alignment apparatus of the subject invention can be employed with a rotating tool and a stationary work piece, a rotating work piece and a stationary tool or with various other combinations of rotating members. For simplicity, however, the operation will be briefly described with respect to the more common situation of a stationary work piece and a rotating tool. In this particular arrangement, the axis alignment apparatus of the subject invention is employed by first securing the mounting stud of the apparatus in the rotating spindle or other tool holder, such as a chuck or collet.

The apparatus is electrically activated after it has been securely mounted in the spindle or tool holder, thus causing the laser beam to be directed toward and impinge upon the work piece. At this stage, the spindle or tool holder is not rotating. Consequently the point of impingement of the laser beam upon the work piece or target defines the point at which a comparably mounted tool would contact the work piece. However, as noted above, the longitudinal axis of any member mounted in a rotating spindle, tool holder or the like seldom is precisely collinear with the true axis of rotation of the rotating machine. Rather, the laser beam more typically would be angularly aligned to the actual axis of rotation and/or would be displaced from the axis of rotation. Regardless of the actual alignment of the laser beam with respect to the true axis of rotation, the axis of rotation can be determined precisely by rotating the spindle and/or tool holder with the subject laser apparatus mounted therein about the rotational axis of this rotating member. One complete rotation of the spindle, tool holder or such will cause the laser beam of an imprecisely mounted laser apparatus to describe or trace an annulus on the work piece or target, with the center of the annular representing the true axis of rotation. The center of the annulus can be determined either by establishing two or more points on the annulus (e.g., two points separated by 180°) or by activating the machine of which the spindle or tool holder is a part to rotate the subject laser apparatus, thus generating the complete annulus. However, if the projection of the annulus and the axis of rotation is made by actual operation of the rotating member, the apparatus most typically would have an integral power supply, such as a battery, rather than a hard wire connection to a power source.

Actual determination of the center of the annulus can be determined manually, but preferably is determined with a target similar to the Model T-204 Target manufactured by Hamar Laser Instruments Inc. or those disclosed in the various patents and patent applications cited above.

DETAILED DESCRIPTION OF THE PREFERRED EMBODIMENTS

Figure 1:
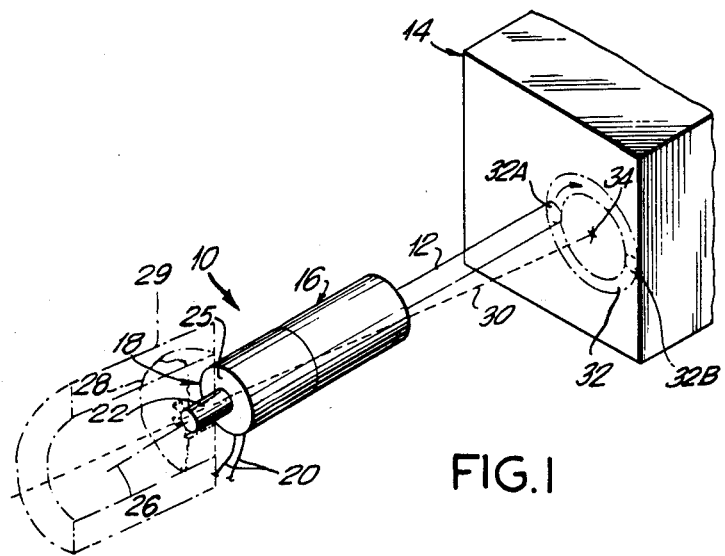
FIG. 1 is a perspective view of the axis projection apparatus of the subject invention projecting a beam onto a work piece.

The laser apparatus of the subject invention is indicated generally by the numeral 10 in FIG. 1. The apparatus 10 is operative to project a laser beam 12 onto a work piece 14 or other similar object, such as a target. The apparatus 10 includes a housing 16 having a mounting end 18. As shown in FIG. 1, a pair of electrical wires 20 extend from the housing 16. The wires 20 extend from a power source (not shown) which is external to the apparatus 10 to provide the power for the lasing element 21 mounted in the housing 16.

The mounting end 18 of the apparatus 10 includes a cylindrical mounting stud 22 and a mounting face 25 which is substantially planar. The mounting stud 22 is accurately manufactured to be perpendicular to the mounting face 25. The perpendicular alignment of the mounting stud 22 to the mounting face 25 facilitates a reasonably well aligned mounting of the apparatus 10. The length and diameter of the mounting stud would be determined by the dimensions of the tool holder 28 with which the apparatus 10 is used. Typically, the mounting stud 22 will be approximately three quarters of an inch long and one-half inch in diameter. As shown most clearly in FIG. 2, it is preferred that the mounting stud 22 and the laser beam 12 share a common longitudinal axis identified by the numeral 26.

Figure 2:
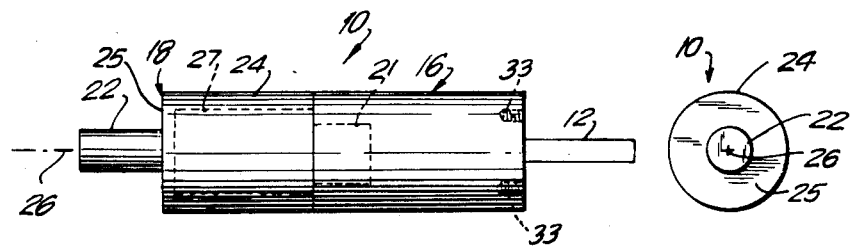
FIG. 2 is a side view of the axis projection apparatus of the subject invention.
Figure 3:
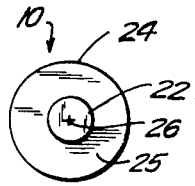
FIG. 3 is an end view of the apparatus shown in FIG. 2.

As noted above, the laser assembly 16 of the apparatus 10 can be either connected by wires 20 to an external power source as shown in FIG. 1, or can be powered by a power source mounted internally such as in cavity 27 shown in FIG. 2. To facilitate the use of an internal power source it is recommended that the apparatus 10 employ a solid state diode lasing element as the light source. For example a small self-contained solid state crystal is desirable for this purpose in that it has a lower power requirement and can be run on a single nine volt dry cell battery. The solid state diode lasing element also is desirable in that it produces a tightly focused beam which enables accurate alignment at distances of 50 feet or beyond. More particularly at a distance of 50 feet the beam will provide a resolution of 0.001 inches. It is also preferred that the lasing wavelength be about 600–900 nm. This long wavelength is less susceptible to stray air currents and thus contributes to the operational stability of the system. Laser diodes that have proved acceptable include Mitsubishi Laser Diodes ML-3101 and ML-3401 and several laser diodes produced by Aeg-Telefunken.

Returning to FIG. 1, the apparatus 10 is shown mounted in a rotating tool holder 28 such as a chuck or collet, which in turn is mounted to a spindle 29 which during operation rotates about a longitudinal axis 30. As noted above, the laser beam 12 produced by the apparatus 10 and the mounting stud 22 of the apparatus 10 share a common longitudinal axis 26. However, as illustrated in FIG. 1, the longitudinal axis 26 of the laser beam 12 is not collinear with the axis of rotation 30 of the rotating spingle 29. Rather, because of misalignments or inaccuracies within the tool holder 28 or spindle 29 the laser beam 12 is angularly aligned with respect to the axis of rotation 30. As illustrated in FIG. 1 the laser beam 12 intersects the axis of rotation 30. However, in other instances the laser beam 12 may be parallel to but radially separated from the axis of rotation 30, or the laser beam 12 and axis of rotation 30 may be skewed with respect to one another. In view of this non-collinear alignment of the laser beam 12 and the axis of rotation 30, rotation of the spindle 29 about the axis of rotation 30 causes the laser beam 12 to generate an annulus 32 on the work piece 14. The size of the annulus 32 of course would be a function of the degree of misalignment of the apparatus 10 in the tool holder 28 or spindle 29 and the distance between the apparatus 10 and the work piece 14. In actual practice, the dimensions of the annulus 32 would be much smaller than those shown in FIG. 1 for distances comparable to those illustrated here for explanation purposes. However, to the extent there is misalignment of the laser beam 12 with respect to the axis of rotation 30, an annulus 32 will always be created. Furthermore, the center 34 of the annulus 32 will always represent the true projection of the axis of rotation 30. Even if the mounting stud 22 and the laser beam 12 are not collinear, the laser beam 12 will still trace an annulus 32 on the work piece 14, the center 34 of which will lie on the axis of rotation 30. However, as noted above, substantial collinearity between the mounting stud 22 and laser beam 12 is desired. This substantial collinearity makes a large annulus 32 unlikely, and thus enables accurate use of targets. Adjustment screws 33 are provided to accurately adjust the alignment of laser beam 12 to achieve or approach collinearity with mounting stud 22.

Although the axis of rotation 30 and the center 34 of the annulus 32 are illustrated in FIG. 1, it is apparent that neither the axis of rotation 30 nor the projection 34 of the axis of rotation 30 onto the work piece 14 would be visible. However, point 34 which defines the projection of the axis of rotation onto the work piece 14 can readily be determined. For example, the apparatus 10 can be activated when the tool holder 28 and spindle 29 are stationary such that the laser beam 12 defines a point 32a on the work piece 14. Point 32a of course is one location on annulus 32. The spindle 29 then can be rotated 180° such that the laser beam 12 projects onto the work piece at location 32b. The projection 34 of the axis of rotation 30 onto the work piece then is mid-way between the projections 32a and 32b of the laser beam 12. This dimension can be checked by rotating the spindle 29 to other angular positions.

As an alternative to the above described procedure, the projection 34 can be determined by causing the spindle 29 to rotate in its normal manner as if a tool rather than the apparatus 10 were mounted therein. In this manner the complete annulus 32 is projected onto the work piece 14. The center of the annulus 32 then can be calculated either manually or by mounting on the work piece 14 a target for automatically calculating the center 34 of the annulus 32. For example, a target, such as those identified above, could be mounted at a defined position with respect to the desired center of a hole to be bored by a tool. Then to the extent the point 34 differs from the desired projection 34 of the axis of rotation 30 onto the target, either the work piece 14 or the tool holder 28 can be adjusted.

Figure 4:
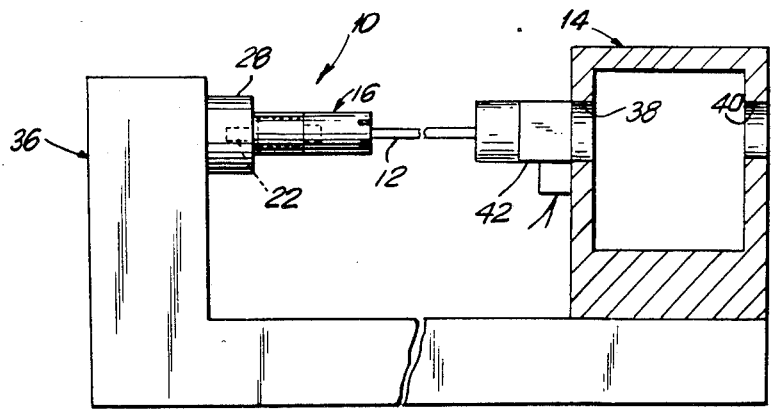
FIG. 4 is an elevational view of the axis projection apparatus, a target and a work piece shown in cross section.
Figure 5:
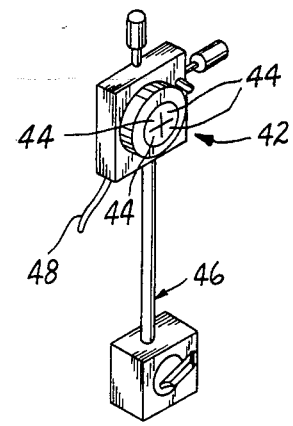
FIGS. 5 and 6 are perspective views of targets which may be employed in the subject invention.
Figure 6:
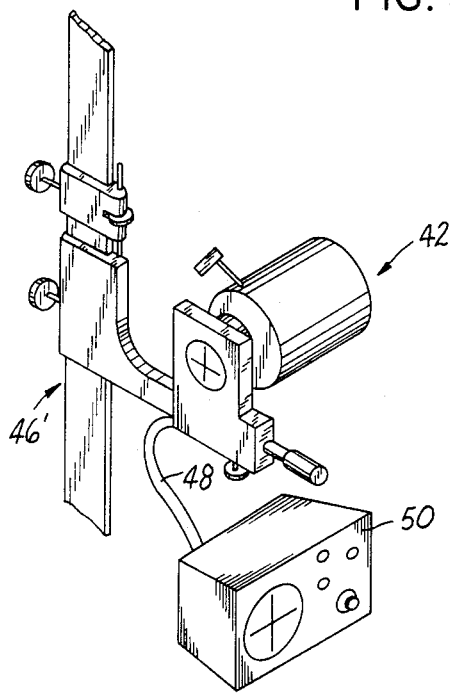

The use of the apparatus 10 with a target as described above is illustrated in FIG. 4. More particularly, the mounting stud 22 of the apparatus 10 is mounted in the tool holder 28 of a rotating machine 36. In this instance, the machine 36 is intended to perform a threading operation on holes 38 and 40 of work piece 14. A target 42 which is capable of identifying locations of the points at which it is impinged by the laser beam 12, is mounted adjacent aperture 38 in work piece 14 and centrally aligned with respect to apertures 38 and 40. FIGS. 5 and 6 depict electronic targets 42 similar to the Model T-204 Target manufactured by Hamar Laser Instruments, Inc. and described in applicant's prior U.S. Pat. No. 3,902,810 which issued to Martin R. Hamar on Sept. 2, 1985. Each electronic target may comprise a cluster of four photocells 44, and may be connected to various fixtures 46, 46′. When the laser beam 12 impinges on the photocells 44, the electrical output of the photocells in the target 42 is fed by a cable 48 to a read-out meter 50. The target 42 further is operative to calculate the center of the annulus produced by the apparatus 10 rotating within the tool holder 28. Thus, by rotating the apparatus 10 and tool holder 28 the true axis of rotation of the tool holder 28 can readily be determined by the target 42. The position of the work piece 14 then can be adjusted such that the actual center of apertures 38 and 40 is collinear with the axis of rotation 30 as calculated by the target 42.

In summary, a laser apparatus for effectively projecting an axis of rotation is provided. The apparatus comprises a housing with a mounting end. The laser assembly can be connected to a power source to project a laser beam from the end of the housing opposite the mounting end. The mounting end includes an elongated mounting stud the longitudinal axis of which is substantially collinear with the laser beam. In operation the mounting stud is mounted in a rotating piece of machinery with the longitudinal axis of the mounting stud approximately aligned with the rotational axis. Rotation of the machinery then causes the laser beam to project an annulus on a work piece, with the center of the annulus representing a point on the true axis of rotation.

Although the apparatus has been described and illustrated with respect to certain preferred embodiments, it is obvious that various changes and modifications can be made therein without departing from the spirit of the present invention which should be limited only by the scope of the appended claims.

What is claimed is:

1. A laser apparatus for effectively projecting the axis of rotation of a rotating tool or work piece holder onto an object spaced therefrom, said apparatus comprising;

a housing having first and second opposed ends;

a generally elongated mounting stud fixedly connected to and extending from the first end of said housing, said mounting stud being of a size and shape to be held by the rotating tool or work piece holder such that the longitudinal axis of the mounting stud is approximately aligned with the axis of rotation of the rotating tool or work piece holder;

a lasing element mounted in said housing and disposed to project a laser beam out of the second end of said of housing and substantially collinear with the longitudinal axis of the mounting stud; and a target disposed on said object, said target including photocell means responsive to the laser beam to produce electrical output signals capable of identifying locations of the points at which the target is impinged by the laser beam projected by the lasing element whereby when the mounting stud is held by the rotating tool or work piece holder, the laser beam projected by the lasing element will trace an annulus on the target disposed on the object, with the center of the annulus defining a point on a projection of the axis of rotation of the rotating tool or work piece holder.

2. A laser apparatus as in claim 1 wherein said mounting stud is a cylinder.

3. A laser apparatus as in claim 2 wherein the first end of the housing further includes a planar mounting surface disposed substantially perpendicular to the mounting stud.

4. A laser apparatus as in claim 1 wherein the lasing element is a single transverse mode diode laser.

5. A laser apparatus as in claim 1 further comprising means for electrically connecting said lasing element to an external power source.

6. A laser apparatus as in claim 1 wherein said apparatus includes an internal area for receiving a power source.

7. A laser apparatus as in claim 6 wherein said internal area for receiving a power source is of a size and shape to receive a nine volt dry cell battery.

8. An apparatus as in claim 1 further including at least one adjusting screw for adjusting the alignment of the lasing element with respect to the mounting stud.

9. A laser apparatus for effectively projecting the axis of rotation of a rotating member onto an object spaced therefrom, said laser apparatus comprising:
a mounting member adapted to be removably mounted to the rotating member; and
a lasing element means secured to the mounting member and being disposed to project a laser beam away from the rotating member and toward the object spaced therefrom, said laser beam being approximately aligned with the axis of rotation of said rotating member; and
a target disposed on said object, said target including photocell means responsive to the laser beam to produce electrical output signals capable of identifying locations of the points at which the target is impinged by the laser beam whereby when the mounting member is mounted to the rotating member, the laser beam projected by the lasing element will trace an annulus on the target disposed on the object, the center of which lies on the axis of rotation of the rotating member.

10. A laser apparatus as in claim 9 wherein the rotating member is a chuck or collet, and wherein the mounting member comprises an elongated mounting stud adapted to be mounted to the chuck or collet.

11. A laser apparatus as in claim 10 wherein the mounting stud is cylindrical.

12. A laser apparatus as in claim 10 wherein the laser beam projected by the lasing element is substantially collinear with the longitudinal axis of the mounting stud.

13. A laser apparatus as in claim 12 further including means for adjusting the alignment of the laser beam projected by the lasing element with respect to the longitudinal axis of the mounting stud.

14. A laser apparatus as in claim 9 wherein the mounting member comprises an elongated mounting stud and a planar mounting surface, said mounting stud being connected to and extending perpendicularly from said mounting surface, said mounting stud being substantially collinear with the laser beam projected by the lasing element.

15. A laser apparatus as in claim 14 wherein the lasing element is a solid stage diode laser.

16. A laser apparatus as in claim 15 wherein the solid state diode laser is a helium neon laser.

* * * * *